June 30, 1964     J. W. GUSTKE     3,138,943
UNIVERSAL JOINT YOKE
Filed Dec. 22, 1961
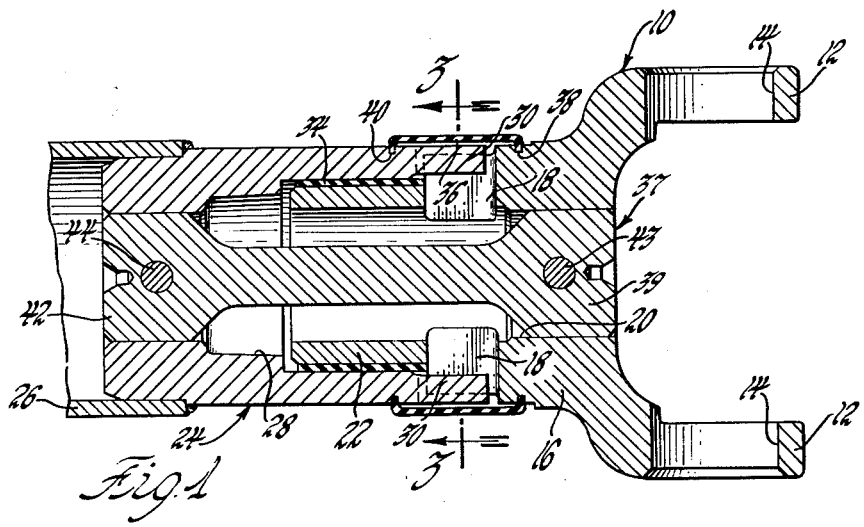
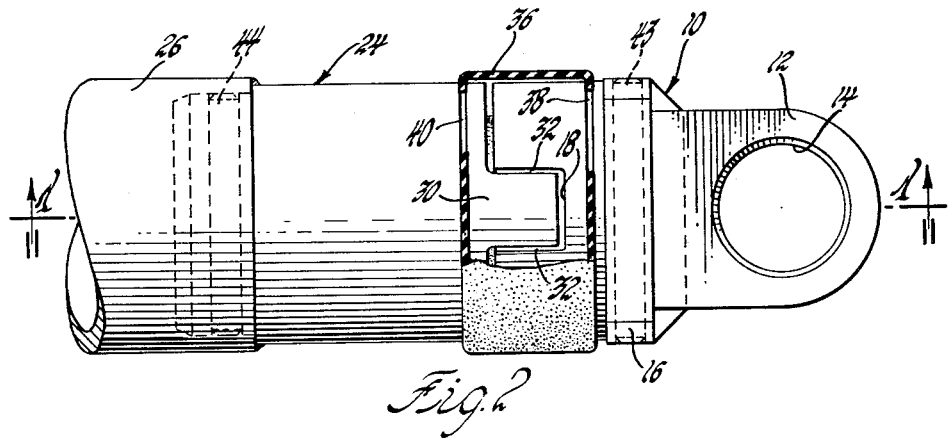
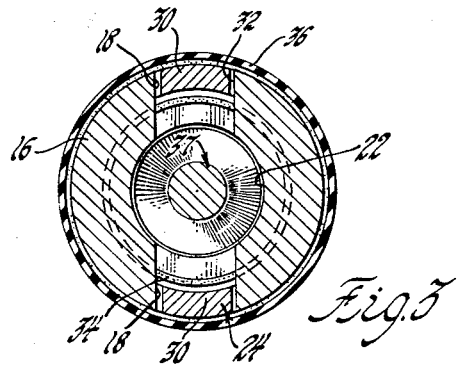
INVENTOR.
John W. Gustke
BY
George A. Schmidt
ATTORNEY 3,138,943
UNIVERSAL JOINT YOKE
John W. Gustke, Saginaw, Mich., assignor to General Motors Corporation, Detroit, Mich., a corporation of Delaware
Filed Dec. 22, 1961, Ser. No. 161,545
3 Claims. (Cl. 64—27)

This invention relates to universal joints, and more particularly to a universal joint yoke provided with means for torsionally damping the universal joint and the driveline with which it is used.

In the manufacture and design of many driven structures, such as automobiles and the like, it is necessary to have a propeller shaft or similar means for transmitting engine torque to the driving means. In many instances this requires the use of universal joints somewhere in the driveline. A major problem in the design and manufacture of such drivelines is to provide for torsional damping of vibrations generated in the system, either in the engine, the driveline or the driven members. Such torsional vibrations are objectionable to the operator and users of the vehicles and it is desirable to eliminate these vibrations. Devices which are generally available to accomplish this result take many forms. Most of these are generally cumbersome and complicated and are extremely expensive.

The device in which this invention is embodied comprises, generally, a universal joint yoke which is formed in two parts, the parts being joined by a torsion bar, or torsion member, which serves to take up the torsional vibrations. The two main parts of the yoke member are joined by a key and slot arrangement which permits limited relative movement between the two parts, which movement is transmitted through the torsion member.

Such a construction is easily assembled in a universal joint yoke and serves the purpose of taking up objectionable torsional vibrations in the vehicle driveline. It is relatively inexpensive to assemble and manufacture, and when the yoke is assembled it is a self contained unit which may be replaced or moved from place to place. Such a device also provides adequate means for balancing existing drivelines which may or may not be provided with some worthwhile torsional vibration damping means.

These and other advantages will become more apparent from the following description and drawing, in which:

FIGURE 1 is a cross-sectional view of the universal joint yoke illustrating the various parts and their location;

FIGURE 2 is a plan view of the universal joint yoke illustrated in FIGURE 1; and FIGURE 3 is a cross-sectional view of the universal joint yoke of FIGURE 1, taken substantially along the line 3—3 of FIGURE 1 and looking in the direction of the arrows.

Referring more particularly to the drawing, the overall construction is best illustrated in FIGURE 1. A universal joint yoke, illustrated generally by the numeral 10, forms a part of the vehicle driveline, not shown, and is connected to the remainder of a conventional universal joint. Yoker member 10 is provided with arms 12 which have cylindrical bearing receiving openings 14 formed therein. This is the usual construction for a Cardan type universal joint, although it is to be understood that this invention is not restricted thereto. A Cardan type yoke 10 is shown for illustration purposes only.

Extending rearwardly from yoke arms 12 of yoke member 10 is a generally cylindrical extension 16 which is provided with a slot 18 or a pair of slots preferably located at opposite sides thereof. Slots 18 extend through the cylindrical extension 16 and into an axial bore 20 formed in the yoke member 10. On the opposite side of extension 16 and slots 18 from yoke arms 12 is a cylindrical portion 22 of smaller diameter than the portion 16. Central axial bore 20 also extends through the portion 22.

A coupling member, illustrated generally by the numeral 24, is secured in any suitable manner to a tubular shaft member 26, as is the usual universal joint construction. This may be a weldment or any other fastening means. Coupling member 24 is provided with a stepped axial bore 28 and is telescopingly received over the extension 22 of yoke member 10. Coupling member 24 is provided with a key 30 or keys preferably located at opposite sides thereof, keys 30 being received in the slots 18 formed in the yoke member 10. The fit between keys 30 and slots 18 is such as to provide a degree of clearance 32. This permits relative rotation of a slight amount between coupling member 24 and yoke member 10. This purpose for this clearance will become apparent hereafter.

In order to protect coupling member 24 and extension 22 of yoke member 10 during any relative rotation, a sleeve bearing or the like 34 may be disposed between these two members. It is not necessary that the bearing be of the type illustrated, although this is preferred.

For protection of the interior of yoke member 10 and coupling member 24 an annular seal 36 may be disposed about the junction between these members. Seal 36 is resilient, and is received in suitable grooves 38 and 40 formed in the yoke member 10 and coupling member 24, respectively.

Clearance 32 is designed to be of greater dimension than the amount of movement caused by normal torsional vibrations in the driveline. That is, coupling member 24 is permitted to move relative to yoke member 10 an amount greater than the movement which would be caused by normal torsional vibration. In order to take up torsional vibrations a torsion bar, illustrated generally by the numeral 37, is rigidly secured at opposite ends in the yoke member 10 and coupling member 24, respectively. End 39 is received in axial bore 20 formed in yoke member 10 and is secured therein in some suitable manner, as by dowel pin 43. End 42 of torsion member 37 is secured within the axial stepped bore 28 of coupling member 24 in a similar manner, as by dowel pin 44. Torsion member 37 is so designed as to damp torsional vibrations that might exist in the driveline and which would be otherwise conducted from shaft member 26 to yoke member 10, or vice versa. During the normal operation of the driveline and which normal torsional vibrations the coupling member 24 is allowed rotation relative to yoke member 10 within the clearances 32 between the keys 30 and slots 18. This relative rotation is resisted by torsion member 37 and thus vibrations causing such relative rotation are absorbed.

Should relative rotation be required of a distance which is beyond clearances 32, the keys 30 will contact the side walls of slots 18, and torque will be transmitted directly from one member to the other.

Thus, a device is provided which eliminates or damps torsional vibrations in a driveline. The structure is self-contained in a single unit which may be assembled as a unit and installed in both future and existing drivelines. The device effectively eliminates normal torsional vibrations which might be transmitted from one part of a driveline to another and yet provides a positive torque transmission from one portion of the driveline to another regardless of the degree of torsional vibrations.

What is claimed is:

1. A universal joint yoke comprising:
a first member having an axial bore therethrough and including a main portion and a portion of reduced diameter, said main portion having bearing cap receiving arms extending therefrom and a pair of slots formed therein and at opposite sides thereof;
a coupling member telescopingly received over said portion of reduced diameter to provide axial rigidity for said yoke, said coupling member having a pair of keys extending therefrom, said keys being received in said slots in said first member and being spaced from the side walls thereof to permit slight rotation of said coupling member relative to said first member;
bearing means disposed between said portion of reduced diameter of said first member and said coupling member;
a torsion member secured at one end in said bore in said first member and secured at the other end in said coupling member to damp out torsional vibrations between said first member and said coupling member.

2. The universal joint yoke set forth in claim 1 and further including a seal member disposed about the junction between said first member and said coupling member and enclosing said keys and said slots for protection thereof.

3. A universal joint comprising a first member including a main portion and an annular extension portion, said member including a pair of axially opening key ways spaced from each other and located between said main portion and said annular portion, a second member having an annular portion telescopically located with respect to said first member annular portion and including a pair of axially projecting keys adapted to be received within said key ways in spaced relationship thereto to provide for limited lost motion in either direction between said first and second members, said first member annular extension portion providing a cylindrical bearing surface adapted to slidably and rotatably support the annular portion of said second member, and a torsion member located within the annular portions of said first and second members and being secured to each member to damp out torsional vibrations therebetween.

References Cited in the file of this patent
UNITED STATES PATENTS

| | | |
|---|---|---|
| 993,570 | Webster | May 30, 1911 |
| 1,636,262 | Troendly | July 19, 1927 |
| 2,394,405 | Schjolin | Feb. 5, 1946 |
| 2,648,208 | Stillwagon | Aug. 11, 1953 |
| 2,822,577 | Reynolds | Feb. 11, 1958 |
| 2,895,315 | Fishtahler | July 21, 1959 |

FOREIGN PATENTS

| | | |
|---|---|---|
| 263,229 | Great Britain | Dec. 24, 1926 |

OTHER REFERENCES

Printed German application (Zittrell et al.), 1,089,281, Sept. 15, 1960 (1 sheet dwg., 2 pp. spec.).